Patented Sept. 29, 1931

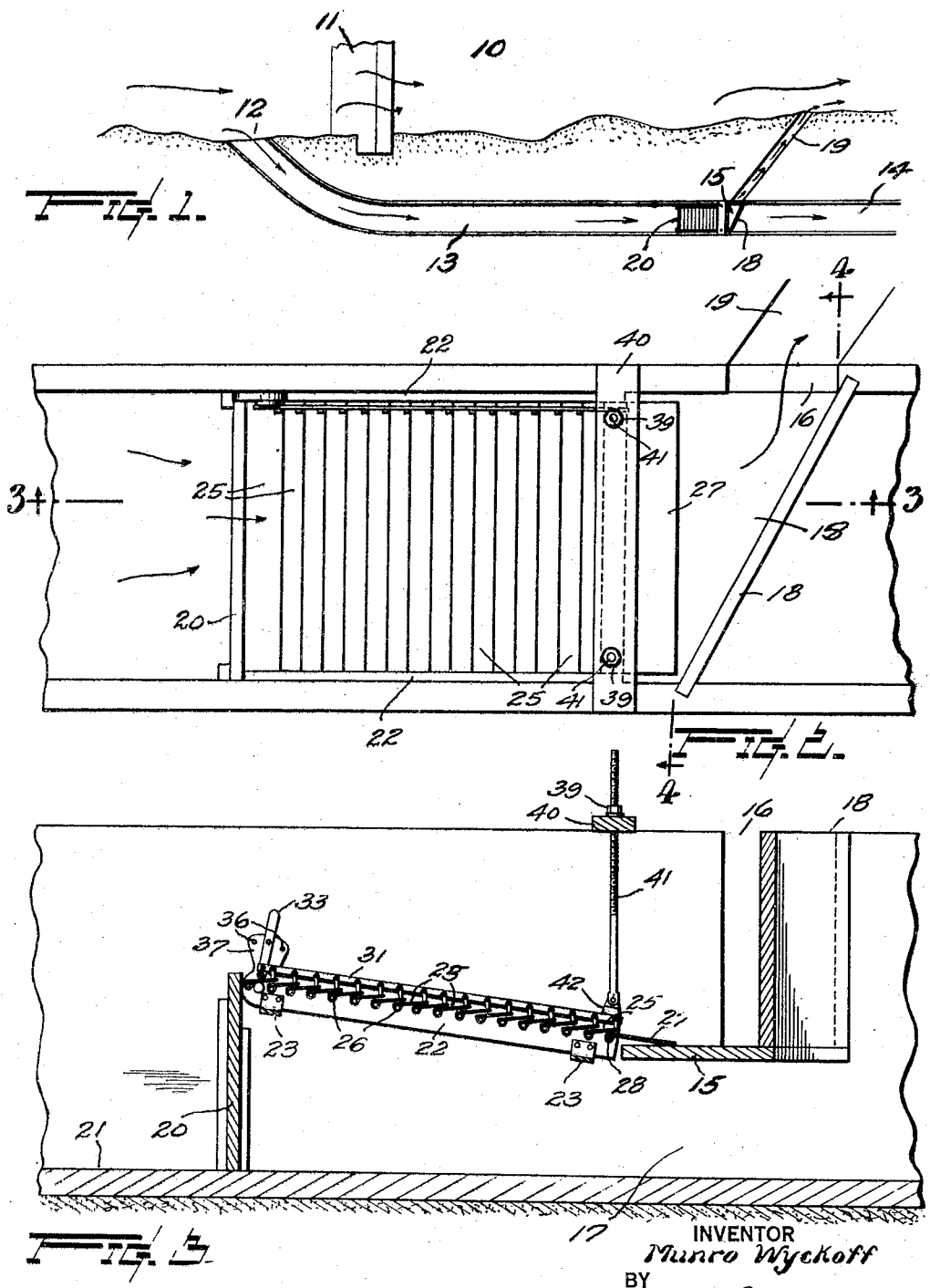

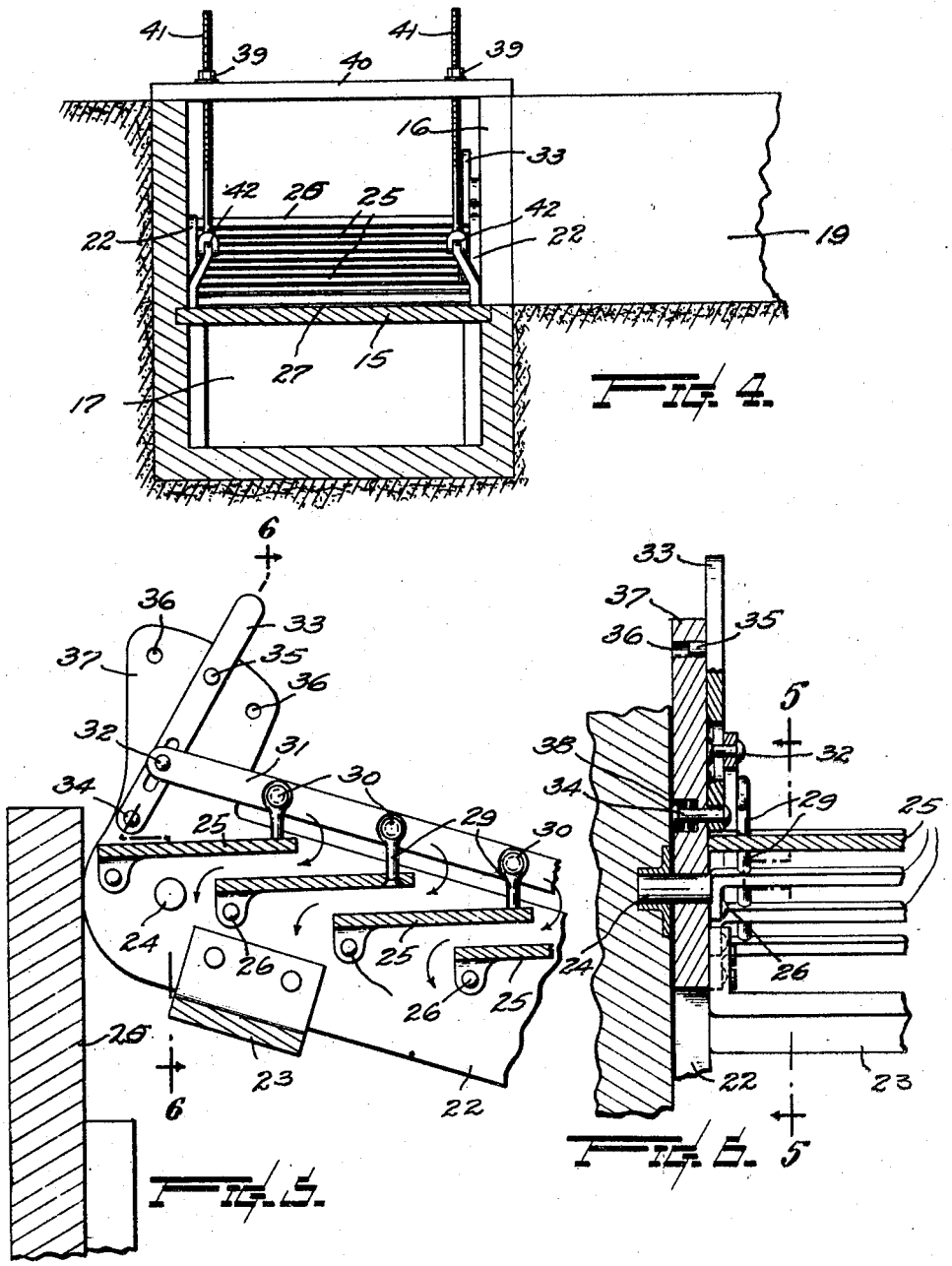

1,825,169

UNITED STATES PATENT OFFICE

MUNRO WYCKOFF, OF SEATTLE, WASHINGTON

FISH GUARD FOR IRRIGATION DITCHES

Application filed April 9, 1928. Serial No. 268,554.

This invention relates to fish-guard devices for canals, or ditches wherein water is conveyed for irrigating land.

The main object of the invention is to provide a device of the character which will obviate the loss of food fish in ditches by interfering with their passage therein and exclude them from the irrigating ditches proper.

Another object is to provide a device which is adapted to be employed for directing fish from the ditch intake back to the source of the ditch's water supply.

Another object is to provide means to accomplish either or both of the above objects by means of apparatus which will be of inexpensive construction, easy to install, convenient to regulate and efficient in use.

More specific objects and advantages of the invention will appear in the following description of an embodiment of the invention now preferred by me. The invention consists in the novel construction, adaptation and combination of parts hereinafter described and claimed.

In the accompanying drawings, Figure 1 is a plan view of devices embodying my invention shown applied; Fig. 2 is a plan view of the improved fish guard to a larger scale shown installed; Figs. 3 and 4 are longitudinal and transverse sectional views on lines 3—3 and 4—4, respectively, of Fig. 2; Fig. 5 is a detail longitudinal vertical section of the upstream end of the guard, said section being taken on line 5—5 of Fig. 6; and Fig. 6 is a transverse vertical section on broken line 6—6 of Fig. 5.

Referring first to the assembly view Fig. 1, the reference numeral 10 represents a body of water such as a stream or river provided with a dam 11; from above which, as at 12, water is supplied through a flume 13 to a ditch 14 which, with said flume, constitutes a portion of a land irrigating system.

At or near the connection between said flume and ditch there is provided in a side wall of the flume, and in spaced relation above the floor 21 thereof, an outlet 16 opening into an overflow trough or spillway 19 through which surplus water is carried back to the river 10 below the dam.

Said outlet 16 is, moreover, located above the level of a platform 15 and at the upstream side of a bulkhead 18 which serves to direct the water from above the platform into said spillway.

At or near the connection of the flume 13 with the ditch 14, a side wall of the flume is provided with an outlet 16 located above the level of a platform 15 and at the upstream side of a bulkhead 18 which extends diagonally across the flume as shown. Below said platform and bulkhead is a tunnel 17 which affords communication between the flume and the ditch and through which tunnel all water for irrigation purposes must pass. Said outlet 16 communicates with a spillway 19 through which surplus water is returned to the stream 10.

In the flume in spaced upstream relation from the platform 15 is an imperforate partition 20 which extends upwardly from the flume floor 21 to an elevation higher than that of said platform.

Provided in the opening between the platform and said partition is a grate having a frame comprising side rails 22 and transverse rails 23; one end of which frame is pivotally connected in proximity of the partition 20 to the side walls of the flume by means of pintles 24; the other, or rear end, extending into close proximity to said platform as shown in Fig. 3. Included in said grate structure and between the side rails 22 of its frame portion is a plurality of transversely arranged slots 25 which are connected at their forward ends, respectively, by means of pivots 26 to the side rails of the frame.

The lengths of said slats, longitudinally of the frame, is such that each will overlie the slat next behind, except with respect to the rearmost slat which overlies an apron plate 27 which is pivotally connected as at 28 to the frame, the free rear end of the apron being supported upon the platform 15.

The foremost of the slats 25 is, moreover, located below the level of the top of the partition 20 so that water passing over the partition will have a tendency to flow progressively over the slats, subject to slope of the grate as a whole and to the sizes of the openings between the successive slats. The grate openings above referred to are regulated by connecting the free ends of the slats by means of arms 29, one for each slat, which are connected by pivots 30 to a bar 31 having one of its ends connected by a pivot pin 32 to an operating lever 33. This lever is fulcrumed by means of a bolt 34 to a side rail of the grate frame and is adapted to be secured in selected positions by means of a stud element 35 of the lever being engaged in any one of a series of holes 36 provided in an extension element 37 of the referred to side rail. To permit lateral movement of the lever for engaging and disengaging its stud 35, the fulcrum bolt 34 (Fig. 6) is movable endwise in opposition to a spring 38, said spring acting to retain the stud in normal engagement with a selected one of the holes therefor.

The grate may be regulated as a single piece by swinging the same upwardly or downwardly about the axis of pintles 24. As illustrated, such grate regulation is accomplished by means of nuts 39 seated upon a supporting beam 40 and engaging screw threaded rods 41 extending through said beam and having their lower ends connected to arm elements 43 of the side rails 22 provided on the grate near its rear end.

In operation water is admitted through the flume so as to flow over the top of the partition, some of such water flowing over the entire length of the grate, onto the platform 15 from whence it escapes through the spillway 19 back to the stream 10. The remainder of the water or that which does not escape through said spillway, finds its way through the apertures intermittent the grate slats, falling into the flume therebelow and thence through the tunnel into the ditch 14 to be eventually utilized for irrigating land. The proportion of water carried over the grate to the quantity withdrawn for use in the ditch is determined by two factors: (1) the slope or inclination of the grate from the horizontal, and (2) to the effective sizes of the opening between the successive slats—the larger the openings, the greater the amount of water falling therethrough. The slats 25 are directed downstream and, in consequence, fish are usually swept over the top of the grate.

Fish which habitually oppose the current are prevented from passing through the interstices of the grate by regulating the slats thereof so as to provide spaces between the same insufficient to accommodate the fish.

What I claim, is—

1. A fish guard device for use in an irrigation ditch having a side outlet in spaced relation above the floor of the ditch, said device comprising a partition for closing the lower portion of the ditch and in upstream spaced relation from said outlet, a grate extending rearwardly from said partition, said grate being provided with transversely arranged slats, said grate being pivotally supported at its upstream end, means provided for raising and lowering the rear end of the grate to adjust the slope of the latter, a horizontally arranged partition provided at the downstream end of said grate, transverse angularly disposed directive means cooperating therewith for conducting water passing over the entire length of the grate into the side opening of the ditch, and an apron pivoted to said grate at the downstream end thereof and having its free end slidable over said horizontal partition, for sealing the downstream end of the grate with respect thereto, said water conducting means permitting the unobstructed flow of irrigating water from said grate in the ditch.

2. A fish guard device for use in an irrigation ditch having a side outlet in spaced relation above the floor of the ditch, said device comprising a partition for closing the lower portion of the ditch and in upstream spaced relation from said outlet, a grate having its upstream end pivotally suspended in close proximity to said partition, the downstream end of said grate depending in an inclined slope therebelow, said grate being provided with transversely arranged slats, means provided at the downstream end of said grate for conducting water passing over the entire length of the grate into the side opening of the ditch, said water conducting means permitting the unobstructed flow of irrigating water from said grate in the ditch, and means acting to maintain a seal between said water conducting means and the grate.

3. A fish guard device for use in an irrigation ditch having a side outlet in spaced relation above the floor of the ditch, said device comprising a partition for closing the lower portion of the ditch and in upstream spaced relation from said outlet, a grate extending rearwardly from said partition, said grate being provided with transversely arranged overlapping slats, means for adjusting said slats for regulating the effective sizes of the interstices therebetween, means including a horizontally disposed partition provided at the downstream end of the grate communicatively arranged with respect to said outlet, an apron carried by said grate at the downstream end thereof, and means provided for raising and lowering the rear end of the grate, said apron being adapted for riding engagement over said partition in selected of said elevated and lowered positions.

4. A fish guard device for use in an irrigation ditch having a side outlet in spaced relation above the floor of the same, said device comprising means including a horizontally disposed partition disposed in spaced relation to the ditch floor and communicating with said outlet, a longitudinally arranged downwardly inclined movable grate having means at the lower end thereof adapted to seal the same with respect to said partition, and means constituting a transversely disposed partition arranged at the upper end of said grate adapted to supply water to flow over the grate from said upper end.

5. A fish guard device for use in an irrigation ditch, said device comprising closure means to the lower portion of the ditch, a horizontally disposed partition disposed in downstream spaced relation below said closure means, a grate comprising overlapping slats arranged coextensively between said partition and closure, means to regulate the effective sizes of the interstices between said slats, means to regulate the declination of said grate from said closure, and means pivoted with respect to the downstream end of the grate adapted to seal the lowermost end thereof with respect to said partition.

6. A fish guard device for an irrigation ditch, said device comprising a grate including overlapping slats, said grate being arranged longitudinally in a declination to the directive travel of the ditch stream, a means to supply water to flow over the grate from the upper end thereof, a horizontally disposed partition adjacent the downstream end of the grate, means to elevate and lower said downstream end of the grate, and means suspended from said downstream end of the grate and adapted to rest on said partition whereby water passing over all the slats of said grate is fed to an outlet communicatively arranged with respect to said partition.

7. A fish guard device for an irrigation ditch, said device comprising means for closing the lower portion of the ditch, a grate extending rearwardly from said closure means and arranged with respect thereto such that water supplied from the ditch entrance is caused to flow over the same, an outlet arranged in spaced disposition downstream from said closure means, means disposed transversely of the ditch communicating with said outlet, means to elevate and lower the grate to vary the declination thereof, and means pivotally supported by said grate and adapted for sliding engagement with respect to said outlet-communicating means for directing the flow of water passing over the length of the grate to the same.

8. A fish guard device for an irrigation ditch, said device comprising means for closing the lower portion of the ditch, a grate extending rearwardly from said closure means and arranged with respect thereto such that water supplied from the ditch entrance is caused to flow over the same, an outlet arranged in spaced disposition downstream from said closure means, means disposed transversely of the ditch communicating with said outlet, and means pivotally supported by said grate and adapted to supply a closed seal between the same and said outlet-communicating means for directing the flow of water passing over the length of the grate to the same.

Signed at Seattle, Washington, this 27th day of February 1928.

MUNRO WYCKOFF.